July 2, 1957     W. F. THOMPSON ET AL     2,797,922
TOY VEHICLE AND PLATFORM INSTRUCTION APPARATUS
Filed April 16, 1953     2 Sheets-Sheet 1
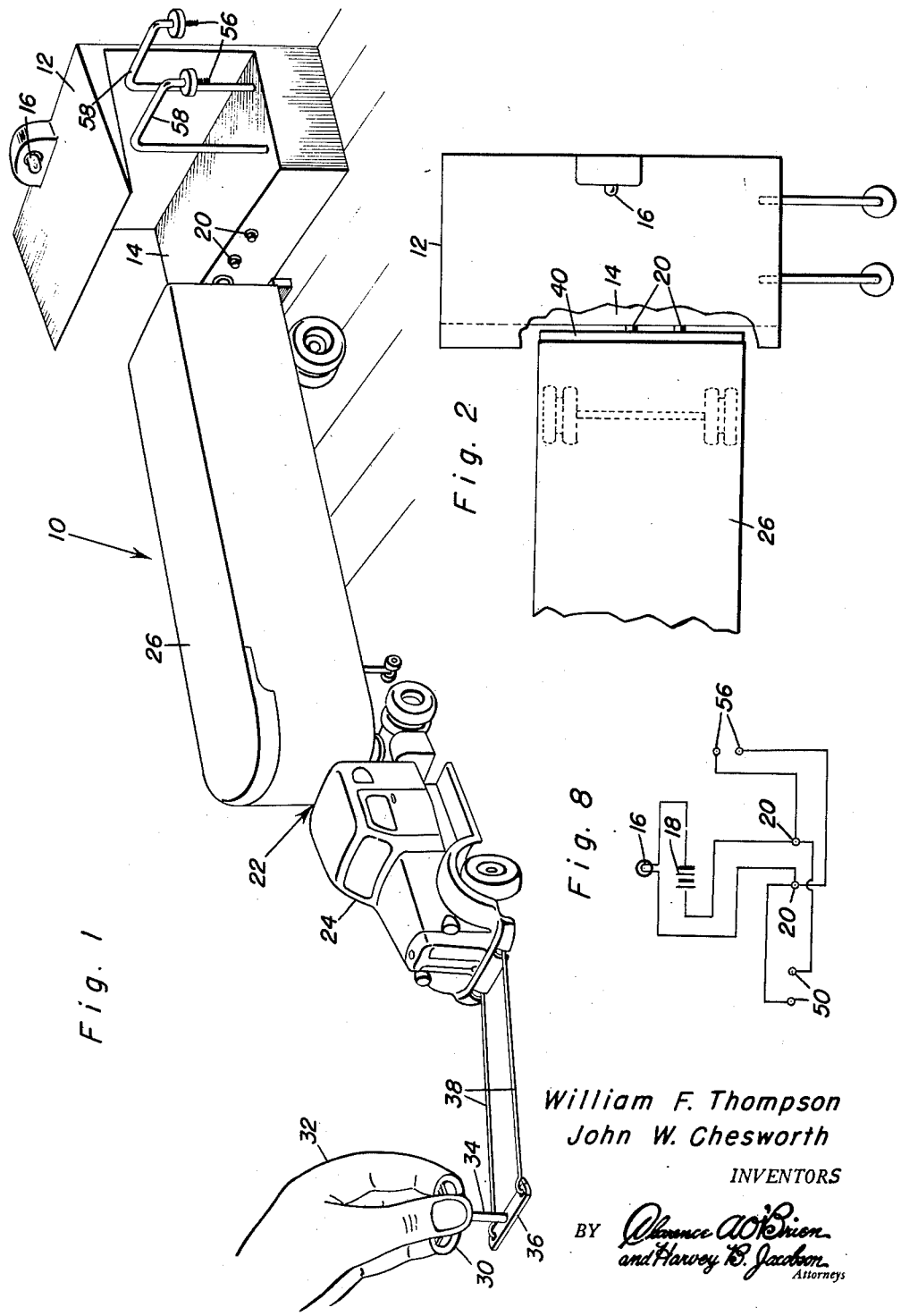
William F. Thompson
John W. Chesworth
INVENTORS July 2, 1957  W. F. THOMPSON ET AL  2,797,922
TOY VEHICLE AND PLATFORM INSTRUCTION APPARATUS
Filed April 16, 1953
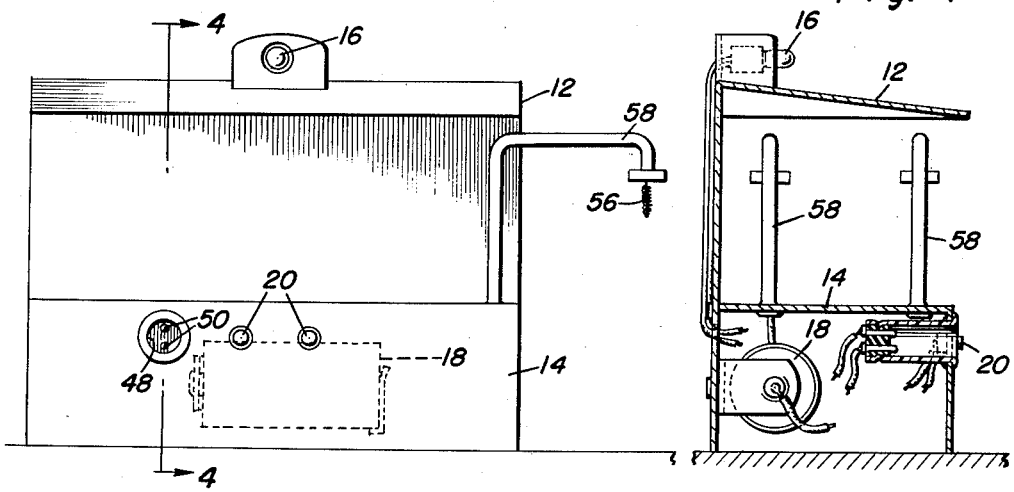
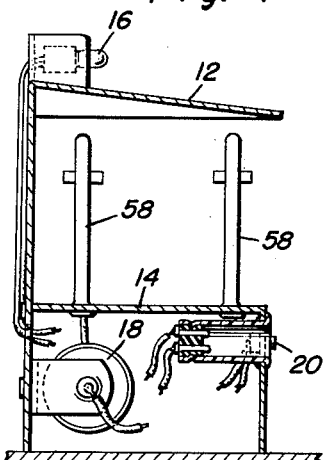
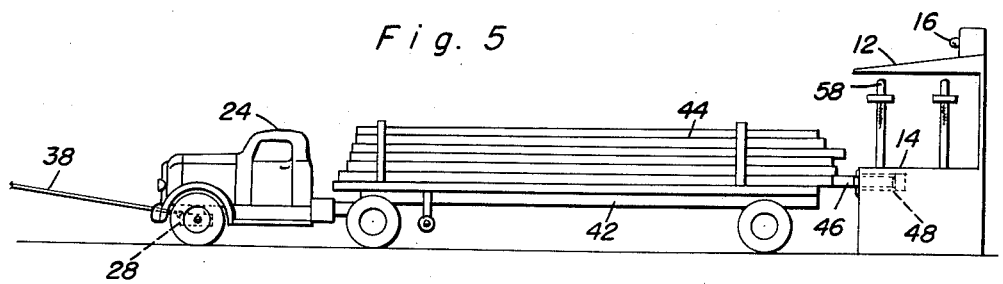
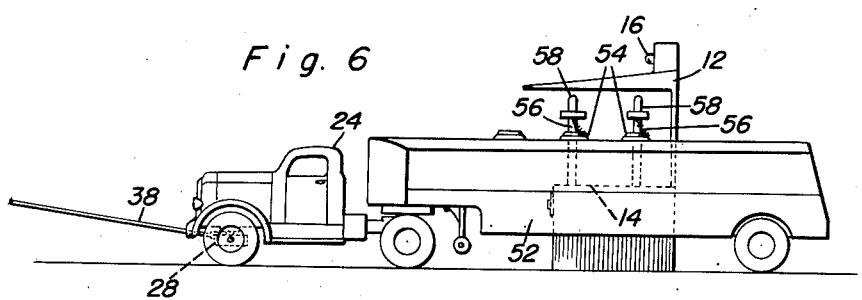
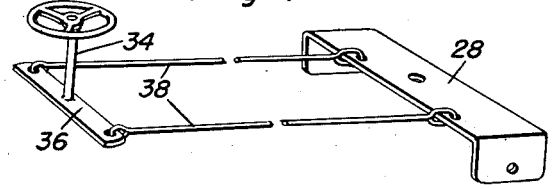
William F. Thompson
John W. Chesworth
INVENTORS United States Patent Office 2,797,922
Patented July 2, 1957

2,797,922

TOY VEHICLE AND PLATFORM INSTRUCTION APPARATUS

William F. Thompson and John W. Chesworth, Philadelphia, Pa.

Application April 16, 1953, Serial No. 349,238

10 Claims. (Cl. 273—1)

This invention relates to new and useful improvements and structural refinements in apparatus used for amusement as well as education or instruction, and the principal object of the invention is to provide an apparatus of the character herein described which may be conveniently and effectively employed for the purpose of testing the ability of a player or student to manipulate a vehicle by remote control so that the vehicle assumes a predetermined position relative to a stationary platform.

In particular, the vehicle herein involved is in the form of a miniature tractor-trailer which, as is well known, is extremely difficult to "back up" such as for example, toward a relatively stationary loading platform. The principal feature of the invention resides in the provision of means for automatically signalling the player or student when the tractor-trailer has been maneuvered so as to assume a predetermined position, namely, at right angles to the stationary platform.

Another feature of the invention resides in the provision of novel switch means for energizing the signalling means, the switch means being presented in a variety of different forms for use in accordance with trailers of different types.

A further feature of the invention resides in the provision of means for simultaneously steering and imparting motion to the tractor-trailer, these means being remotely controlled by the hand of the player or student.

Some of the advantages of the invention reside in its simplicity of construction, in its amusing but highly instructive characteristics and in its adaptabilty to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention in use;

Figure 2 is a fragmentary top plan view thereof, the same being partially broken away so as to illustrate the arrangements of the switch unit;

Figure 3 is a front elevational view of the station and platform with the various type of switch units and the signalling device thereon;

Figure 4 is a vertical sectional view, taken substantially in the plane of the line 4—4 of Figure 3;

Figures 5 and 6 are side elevational views illustrating two different modified forms of the invention;

Figure 7 is a perspective detail of the remote control means; and

Figure 8 is a wiring diagram of the electrical components of the invention.

Like characters of reference are employed to designate like parts in the specification and throughout the several views.

Referring now to the accompanying drawings in detail, the apparatus shown in Figure 1 is designated generally by the reference character 10 and embodies in its construction a miniature station 12 including a loading platform 14, the station being provided at the top thereof with an electrical signalling device, such as for example, a lamp 16 which is electrically connected to a suitable source of current, such as for example, a battery 18 which is housed within the platform 14, as shown.

An electrical unit consisting of a pair of transversely spaced contacts 20 is provided on the front face of the platform and is connected in series with the battery 18 to the signal lamp 16, as is clearly shown in Figure 8.

The invention also contemplates the provision of a vehicle, namely, a tractor-trailer 22 including a tractor portion 24 and a trailer portion 26, these being substantial miniature reproductions of an actual tractor-trailer, as is clearly illustrated in Figure 1.

The tractor 24 is provided with a steerable front axle 28 and both the movement and the steering thereof is controlled remotely by a steering wheel 30 which is adapted to be held in the hand 32 of a player or student.

The wheel 30 is secured to a short shaft 34 which also has rigidly secured thereto a double arm crank 36, and the latter is operatively connected by a pair of rods 38 to the front axle 28 of the tractor 24 as shown. It will be apparent from the foregoing that by simply actuating the steering wheel 30, that is by either shifting its location or by turning the same, the entire vehicle 22 may be moved forwardly or rearwardly and also steered in a realistic manner.

A coacting switch unit consisting of a transverse contact bar 40 is secured to the rear end of the trailer 26 and when the invention is placed in use, the vehicle 22 is manipulated or maneuvered rearwardly and is simultaneously steered in an effort to place the trailer 26 in a position where it is backed up and substantially at right angles to the loading platform 14. In that position, the contact bar 40 simultaneously engages the two contacts 20, thus electrically bridging the same and energizing the signal lamp 16 so as to place the operator on notice that the vehicle has been correctly manipulated.

In a modified form of the invention shown in the accompanying Figure 5, the trailer 42 carries a plurality of miniature logs 44, one of which projects rearwardly to a substantial extent from the trailer and constitutes an electrical contact member 46. This contact member is slidably receivable in a horizontal bore 48 with which the platform 14 is provided, the bore 48 having an open outer end to receive the member 46 while a pair of spaced contacts 50 are provided in the inner end portion of the bore 48. These contacts are in series with the battery 18 and the lamp 16 and when the vehicle has been properly manipulated so that the trailer 42 is at right angles to the platform 14 and the track member 46 has been inserted in the bore 48, the contacts 50 will be bridged electrically and the lamp 16 will be energized.

Another modified form of the invention is shown in the accompanying Figure 6, wherein the trailer 52 is of the "tank-type," having a plurality of miniature "man-hole covers" 54 at the top thereof, these "man-hole covers" constituting contact members which are engageable by resilient contact elements 56 suspended from a pair of standards 58 secured to the platform 14. When the trailer 52 has been correctly manipulated, so that it is disposed along side but still at right angles to the front of the platform 14, the contact elements 56 will electrically engage the contact members 54 and the circuit to the signal lamp 16 will be completed.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

What is claimed as new is as follows:

1. Amusement or instruction apparatus comprising in combination a station including a platform, an electrical signal device provided on said station, a portion of a switch unit having electric contacts provided on said platform and in circuit with said signal device and a source of electrical energy, a steerable vehicle adapted to be maneuvered toward and away from said platform, and a coacting portion of a switch unit having a contact bridging member carried by said vehicle and operatively engageable with the first portion of a switch unit when said vehicle is in a predetermined position relative to said platform thereby closing the circuit and actuating the signal device.

2. The apparatus as defined in claim 1 together with means for steering said vehicle.

3. An amusement or instruction apparatus comprising in combination a station including a platform, an electrical signal device provided on said station, a portion of a switch unit having electric contacts provided on said platform and in circuit with said signal device and a source of electrical energy, a vehicle adapted to be maneuvered toward and away from said platform and comprising a tractor-trailer having a movable front axle, remotely controlled means for simultaneously moving said front axle and imparting motion to said vehicle, and a complemental portion of a switch unit having a contact bridging member provided on the trailer portion of said tractor-trailer and operatively engageable with said first mentioned portion of a switch unit when the tractor-trailer is maneuvered to a position wherein the trailer portion thereof is at right angles to said platform for energizing the signal device.

4. The apparatus as defined in claim 3 wherein said remote control means comprises a steering wheel adapted to be held in the hand of the operator, a double crank connected to said steering wheel, and a pair of reach rods connected to said crank and to the front axle of said vehicle.

5. The apparatus as defined in claim 3 wherein said first mentioned switch means comprises a pair of spaced horizontally aligned contacts provided on said platform, said bridging member comprising a transverse bar secured to the rear end of the trailer portion of said tractor-trailer and engageable with said contacts.

6. The apparatus as defined in claim 3 wherein said platform is provided with a horizontal bore having an open outer end, said first mentioned portion of a switch unit having the contacts mounted in the inner end of said bore, said contact bridging member on the complemental portion of a switch unit comprising an elongated contact member projecting rearwardly from the trailer portion of said tractor-trailer, said elongated contact member being slidably receivable in said bore and engageable with said contacts.

7. The apparatus as defined in claim 3, wherein said first mentioned portion of a switch unit comprises a pair of spaced standards provided on said platform with the contacts being suspended from the respective standards, said bridging member on said complemental portion of a switch unit including a pair of spaced but electrically connected contact members provided on the trailer portion of said tractor-trailer and engageable with the respective contacts on the standards.

8. A toy comprising in combination a station including a platform, an electrical signal device provided on said station, a pair of contacts provided on said platform and in circuit with said signal device and a source of electrical energy, a steerable vehicle adapted to be maneuvered toward and away from said platform, and a contact bridging member carried by said vehicle and engageable with the pair of contacts when the vehicle is in predetermined position relative to said platform thereby closing the circuit between the signal device and the source of electrical energy thereby actuating the signal device.

9. The structure as defined in claim 8 wherein said vehicle is provided with a remote control mechanism including a pivotal front axle, a steering wheel adapted to be held in the hand of the operator, a double crank connected to said steering wheel, and a pair of rods connected to said crank and to the front axle of said vehicle for simultaneously steering the vehicle and imparting motion to said vehicle.

10. A toy comprising a platform, a plurality of contacts on said platform, said contacts being connected to a source of electrical energy and a signal device, a vehicle, a bridging bar on said vehicle, means for controlling movement of the vehicle for positioning the vehicle with the bridging bar electrically bridging said plurality of contacts on the platform for energizing the signal device.

References Cited in the file of this patent

UNITED STATES PATENTS

| | | |
|---|---|---|
| 1,858,020 | Linke | May 10, 1932 |
| 1,866,477 | Moore | July 5, 1932 |
| 2,092,905 | Brumbelow | Sept. 14, 1937 |
| 2,208,426 | Livingston | July 16, 1940 |
| 2,454,896 | Traub | Nov. 30, 1948 |
| 2,642,700 | Zimmer | June 23, 1953 |
| 2,647,343 | Zileri et al. | Aug. 4, 1953 |
| 2,650,094 | Zimmer | Aug. 25, 1953 |
| 2,658,967 | Matschke | Nov. 10, 1953 |

FOREIGN PATENTS

| | | |
|---|---|---|
| 413,585 | Italy | May 20, 1946 |